Aug. 12, 1930.                S. POLLAK                 1,772,685

ADJUSTING AND CLAMPING COLLAR

Filed Oct. 23, 1925

Inventor.
Solomon Pollak
by Parker & Carter
Attorneys

Patented Aug. 12, 1930

1,772,685

UNITED STATES PATENT OFFICE

SOLOMON POLLAK, OF SAN FRANCISCO, CALIFORNIA, ASSIGNOR TO LINK-BELT COMPANY, OF CHICAGO, ILLINOIS, A CORPORATION OF ILLINOIS

ADJUSTING AND CLAMPING COLLAR

Application filed October 23, 1925. Serial No. 64,325.

This invention relates to a support for bearings and particularly to an adjusting and clamping collar support for high speed bearings. In the form shown herewith it is applied to a high speed roller bearing supporting and carrying standard shafting such as line shafting. It has for one object to provide a bearing and bearing support which may be manufactured, adjusted, assembled and thereafter treated as a unit, and which may be placed in position and have a shaft inserted through it, and the shaft thereafter readily fastened so as to be supported in the bearing. Another object is to provide in such a construction an adjusting and bearing centering collar for high speed bearings. Other objects will appear from time to time throughout the specification and claims.

My invention is illustrated more or less diagrammatically in the accompanying drawing, wherein.

Like parts are indicated by like characters throughout.

A is a shaft. B is a bearing sleeve through which the shaft is inserted and which is caused to grip it in the manner described below. The sleeve B is slotted as at $B^1$ and is provided with tapered portions $B^2$ threaded adjacent the end as at $B^3$.

Figures 1, 3:
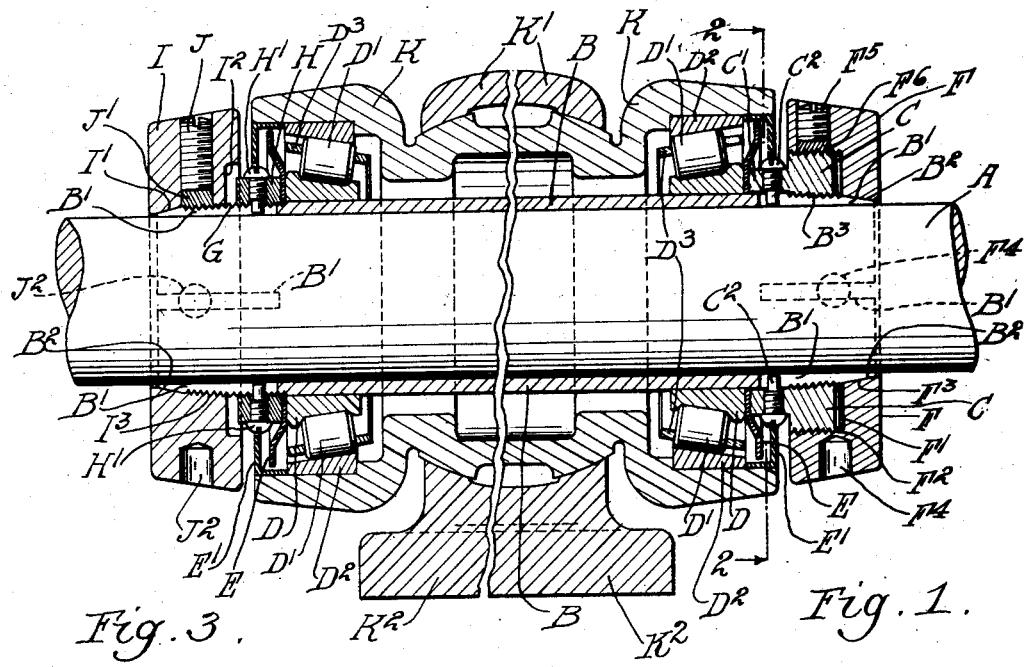
Figure 1 is a section through the bearings showing one form of the device.
Figure 3 is a view similar to Figure 1 showing a modified form.
Figure 2:
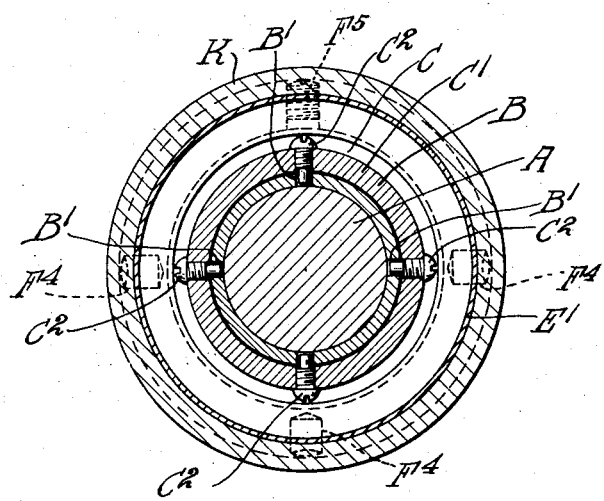
Figure 2 is a transverse section taken on the line 2—2 of Figure 1.

Describing now the form of invention shown in Figure 1: C is a collar threaded interiorly and exteriorly. It is provided with a reduced extension or flange $C^1$ which is provided with threaded perforations for set screws $C^2$.

D is an inner race mounted on the sleeve B. $D^1$ are rollers. $D^2$ is an outer race. E is an inner dust ring and co-operating with this ring is an outer dust ring $E^1$. F is a collar provided with a hollowed portion $F^1$ and interiorly threaded as at $F^2$. The collar F is provided on its interior with a wedge face $F^3$, and a plurality of wrench holes $F^4$. $F^5$ is a set screw. $F^6$ is a separable plug beneath the set screw $F^5$. The set screws may be adjusted to compress the lead plug on the outer threaded portion of the collar C to lock the collar C and the collar F together.

Describing now the form of device shown in Figure 3: G is the threaded portion on the outside of the sleeve B. It will be noted that it is longer than the threaded portion $B^3$ in the form of the invention illustrated in Figure 1. H is a short collar provided with set screws $H^1$. The bearing, race, rollers and dust rings are the same in each form of the invention.

I is a wedge collar provided on its interior with a wedge face $I^1$ and a cut away or reduced portion $I^2$. It is interiorly threaded as at $I^3$ and is provided with a perforation in which a set screw J is positioned. $J^1$ is a lead or other separable plug which by the adjustment of the screw J is forced against the threaded portion G of the sleeve B and thus holds the collar I in fixed relation with the sleeve. $J^2$ are wrench holes in the collar I. K is a bearing housing supported in a holding member $K^1$, and which is carried on a base $K^2$. The housing K is shaped to receive the bearing and bearing race and other such parts. Its details form no particular part of the present invention.

Although I have shown an operative device, still it will be obvious that many changes might be made in size, shape and arrangement of parts without departing materially from the spirit of my invention; and I wish, therefore, that my showing be taken as in a sense diagrammatic.

The use and operation of my invention are as follows:

The bearing including the housing, sleeve and bearing parts is preferably assembled in advance at the factory. When it is to be placed in operation, the shaft which it supports is inserted through the bearing sleeve. In the form shown in Figure 1 the dust rings are placed in position and the outer collar C is then screwed in position on the sleeve B, being finally fastened in position against rotation, by means of the set screws $C^2$ which hold it against turning. The wedge collar F is then screwed in position engaging the threads on the outside of the collar C. It is screwed up until its wedge face acts upon the tapered ends B² of the sleeve B to wedge or clamp them against the shaft A. When this has been screwed far enough to make a satisfactory engagement of these parts, the lead plug and the set screw are inserted and the screw is screwed down and the wedge collar F is thus held in position.

In this form of the invention there is further co-operation of the two collars and the sleeve in holding the shaft in the sleeve. The first collar is merely screwed upon the sleeve but does not itself serve to lock the sleeve and shaft together. It serves primarily as a positioning and supporting member upon which the second or wedging and locking collar is positioned, and it is this last collar, the collar F, which has the wedging action that binds the sleeve against the shaft.

In the form shown in Figure 3 the collar H is inserted and serves merely the purpose of holding in position one of the dust rings. As will be noticed, it is smaller than the collar C shown in Figure 1 and is threaded only on its interior. Like that collar it is held against rotation by set screws H¹. When it has been put in position the wedging collar I is screwed directly upon the threaded exterior G of the sleeve B, and its wedge face, co-operating with the tapered portion B² of the sleeve B, wedges and locks the sleeve against the shaft A, thus holding the two together, and when the wedge collar I has been screwed far enough onto the sleeve to make a satisfactory lock, the plug J¹ is inserted, the set screw J is screwed in position, and the collar I is thus held against accidental rotation. This form of the invention therefore differs from the form shown in Figure 1 in that the wedge collar co-operates with the sleeve not merely to carry out the wedging action but also to retain the sleeve in position since it is threaded downwardly upon the sleeve.

I claim:

1. In combination in a bearing, a housing for said bearing and a solid unitary sleeve within said housing, a shaft passing through said sleeve, said sleeve having slotted ends and provided at its ends with inclined portions and being threaded adjacent its ends, such inclined portions being free from threads and a solid unitary continuous spacing ring adapted to be seated on each of such threaded portions and a solid unitary wedge ring provided on its interior face with an inclined wedging portion and with a generally flat threaded portion, such wedging ring adapted to be seated on the end of such sleeve, its threaded portion adapted to engage the threaded portion of the sleeve and its inclined portion adapted to engage the inclined portion of the sleeve, the wedging ring as a whole adapted to be drawn inwardly on the sleeve and thereby to wedge the ends of the slotted portions of the sleeve against a shaft.

2. In combination in a bearing, a housing for said bearing and a solid unitary sleeve within said housing, a shaft passing through said sleeve, said sleeve having slotted ends and provided at its ends with inclined portions and being threaded adjacent its ends, such inclined portions being free from threads and a solid unitary spacing ring adapted to be seated on each of such threaded portions and a solid unitary continuous wedge ring provided on its interior face with an inclined wedging portion and with a generally flat threaded portion, such wedging ring adapted to be seated on the end of such sleeve, its threaded portion adapted to engage the threaded portion of the sleeve and its inclined portion adapted to engage the inclined portion of the sleeve, the wedging ring as a whole adapted to be drawn inwardly on the sleeve and thereby to wedge the ends of the slotted portions of the sleeve against a shaft, and dust guarding members within such housing, one of such members being held in position by said spacing ring.

Signed at San Francisco, county of San Francisco, and State of California, this 26th day of June, 1925.

SOLOMON POLLAK.